United States Patent [19]

Peeters

[11] Patent Number: 4,616,275
[45] Date of Patent: Oct. 7, 1986

[54] DISC SERVO WITH 1F-2F SERVO PATTERN
[75] Inventor: Bradford D. Peeters, Dublin, Calif.
[73] Assignee: Priam Corporation, San Jose, Calif.
[21] Appl. No.: 663,398
[22] Filed: Oct. 22, 1984
[51] Int. Cl.$^4$ .............................................. G11B 5/56
[52] U.S. Cl. ...................................................... 360/77
[58] Field of Search ......................................... 360/77

[56] References Cited
U.S. PATENT DOCUMENTS
4,101,942  7/1978  Jacques ................................. 360/77
4,415,939  11/1983  Ballard ................................. 360/75

OTHER PUBLICATIONS
IBM ® Technical Disclosure Bulletin, vol. 23, No. 1, Jun. 1980, pp. 318–319, 1F/2F Phase Alignment System, R. Jenkins.

Primary Examiner—George G. Stellar
Attorney, Agent, or Firm—Flehr, Hohbach, Test, Albritton & Herbert

[57] ABSTRACT

A disc servo pattern and servo detector for use in a system for reading and writing data on a magnetic disc. The magnetic disc has a servo data area formatted with a multiplicity of servo tracks which are formatted with a 1F-2F servo pattern. Each servo frame has a single sync pulse and a single position pulse at predefined positions. The 1F frames are those frames where the sync pulse and position pulse are of opposite polarity. The 2F frames are those where the sync and position pulses are of like polarity. Fill-in pulses separate neighboring sync and position pulses of like polarity.

In a preferred embodiment the servo pattern in each servo track is the same as the servo pattern of the neighboring servo track shifted by one frame. Each track has a repeating pattern of two 1F frames followed by two 2F frames, and so on.

The system has a servo head for reading a servo pattern on a magnetic disc and producing a servo carrier signal corresponding thereto. The servo detector generates a position signal proportional in amplitude and polarity to the extent and direction that the servo data head is off track. It includes an amplifier for amplifying the servo signal and producing a servo carrier signal. An integrator integrates the servo carrier signal and develops a position signal. A switch connects the servo carrier signal to integrator at times corresponding to the position pulses in a predefined pattern of the frames.

18 Claims, 11 Drawing Figures

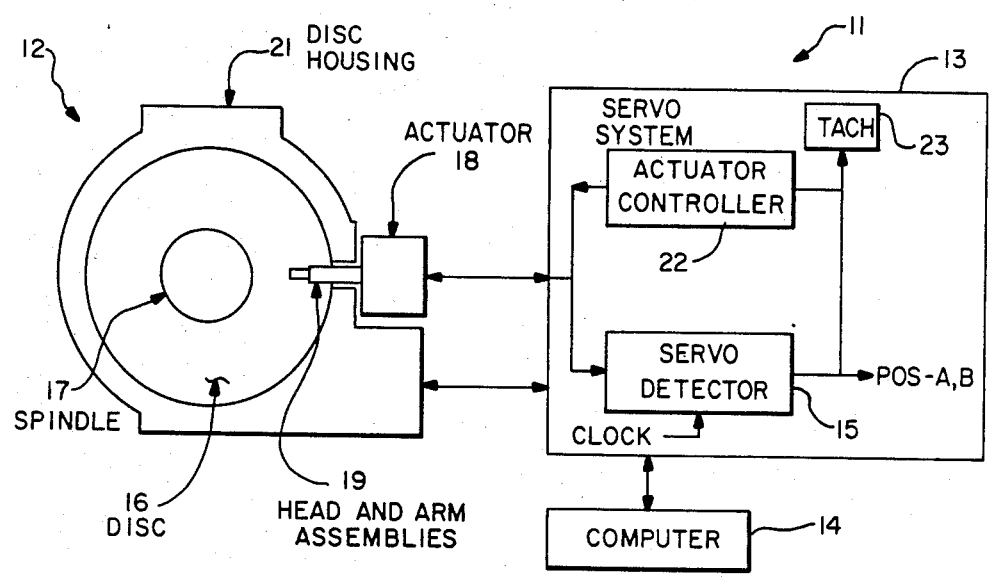
FIG. — 1
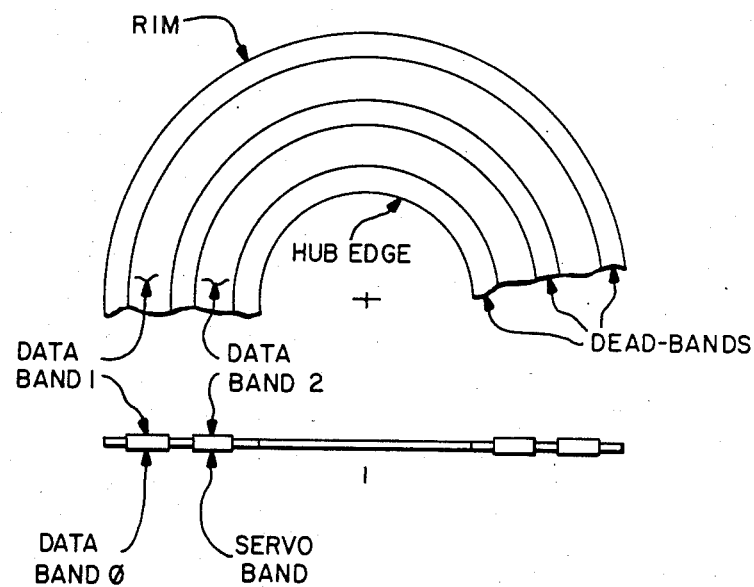
FIG. — 2

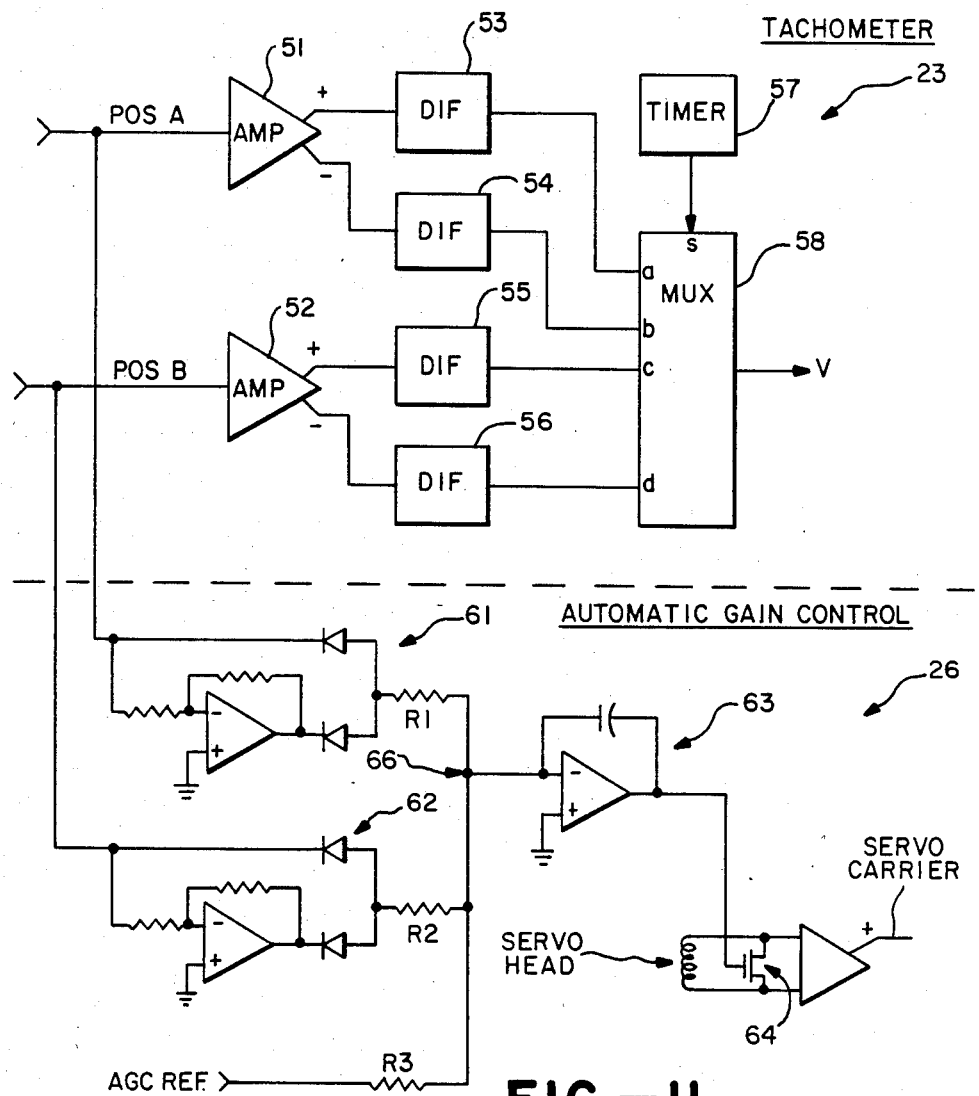
FIG.—11
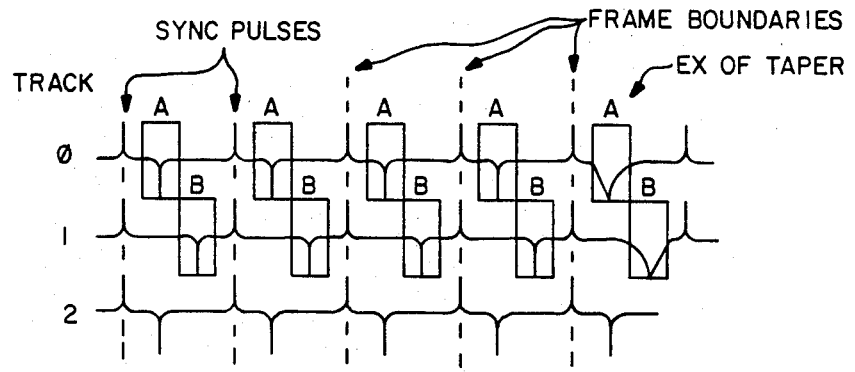
FIG.—4  PRIOR ART SERVO PATTERN

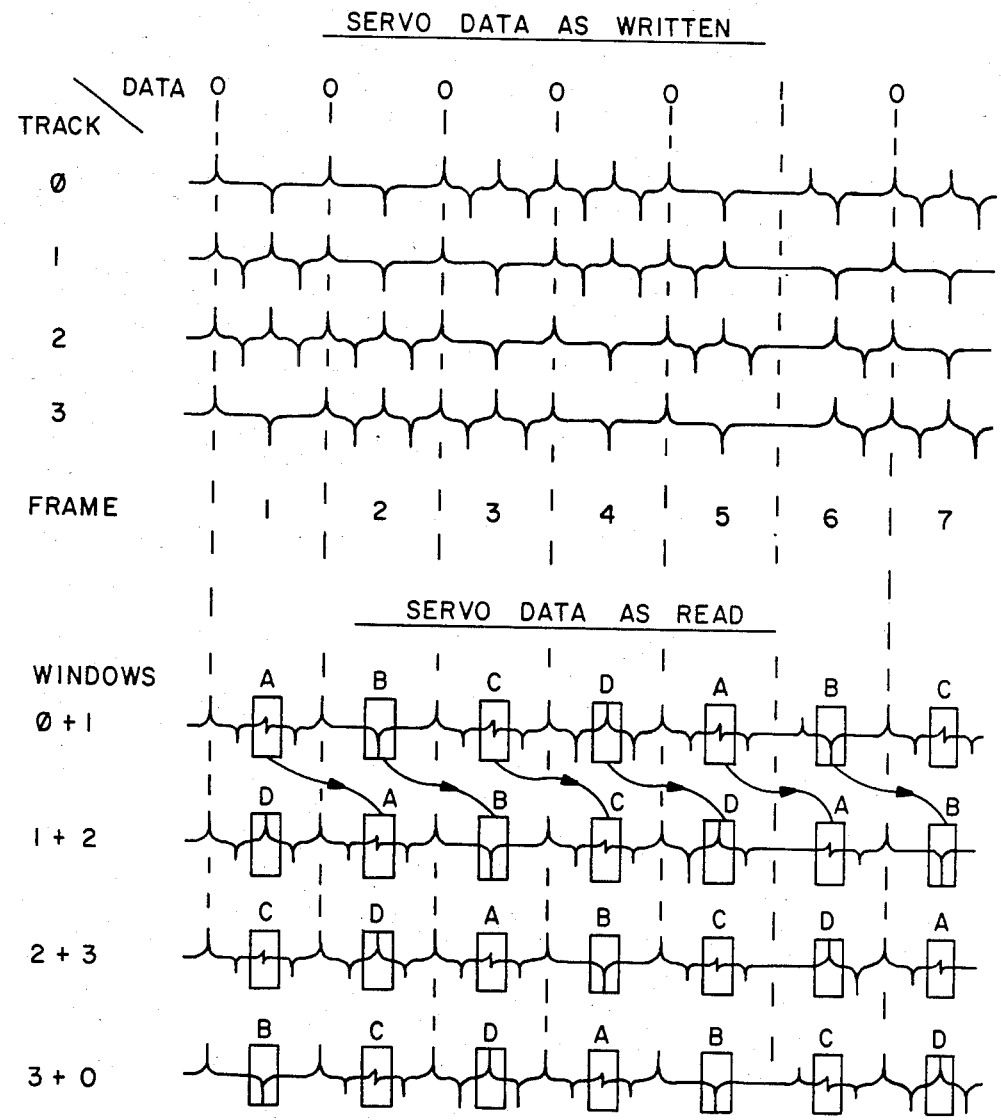
FIG.—5
FIG.—6

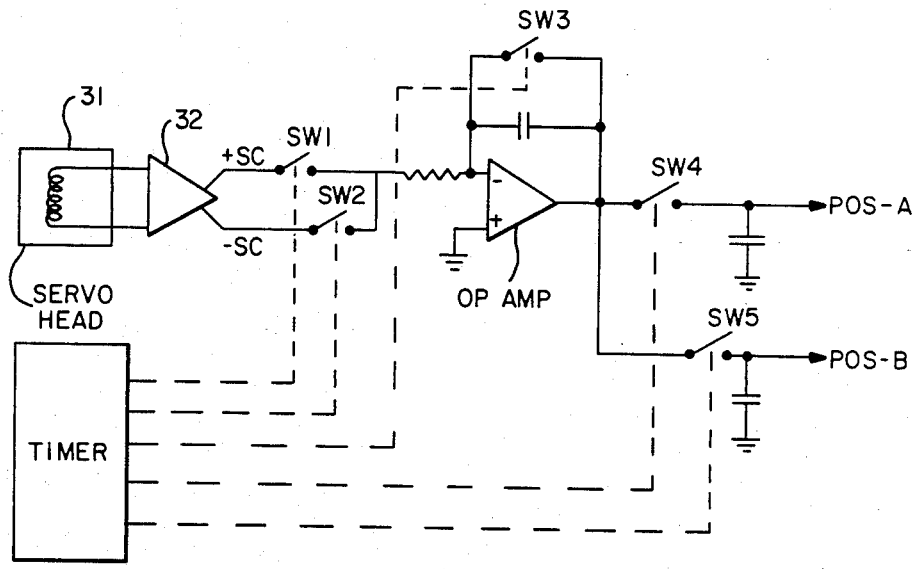
FIG.—9
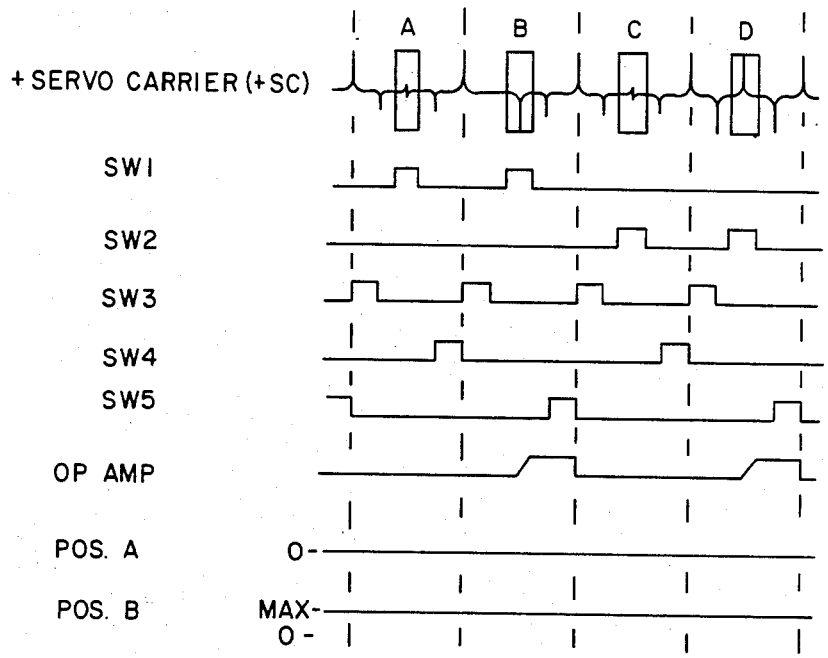
FIG.—10

DISC SERVO WITH 1F-2F SERVO PATTERN

The present invention relates generally to disc drives and particularly to a disc servo pattern and servo detector.

A disc servo pattern is a magnetic pattern that is written on a disc. The servo pattern is generally written on a disc area used solely for holding the servo pattern. It is used for aligning the read/write head(s) of the disc with the data tracks on the disc.

In a single platter system (i.e., a system having a single disc), the disc servo area is generally one of two or four defined data storage areas on the disc. In a multi-platter system, there is still usually only a single disc servo area serving the system.

The read/write heads associated with all the data storage areas are fixed in terms of their relative locations with respect to one another. Therefore when the servo area's head is "on track", so are the heads for the other tracks.

In the prior art, a servo pattern known as the "tri-bit" servo pattern has been predominant. As will be explained in detail below, the tri-bit pattern works by "balancing" or comparing the strength of two magnetic position pulses with one another. If either pulse is stronger than the other, then the disc head is off track in a direction corresponding to the stronger pulse.

The tri-bit servo pattern, however, has several problems. First, the tri-bit pattern is subject to "cross talk" from nearby data heads. In other words, noise from other data heads can cause the comparison of the two positioning bits in the tri-bit pattern to be corrupted by extraneous signals.

Second, the tri-bit pattern is subject to a problem known as "taper". The position pulses of the tri-bit pattern are supposed to be sharp, well-defined pulses. Taper is caused by the widening of the position pulses in the tri-bit pattern, to the point where they start to overlap. This occurs, typically, as the disc head moves towards the center of the disc.

As explained in somewhat greater detail below, and as is well known to those skilled in the art, to compensate for taper, disc systems are typically designed to move the data heads more slowly than would be possible if taper did not exist. Therefore the tri-bit pattern's taper problem results in a reduction of the overall performance of the disc system.

Third, the tri-bit pattern is subject to a problem called skew, which can also cause taper. Skew is the angle between the data head and the circular data track at the point of the data head. Non-zero skew occurs in disc systems where the data heads move along a path which is not radial with respect to the discs. Many systems use non-radial data head paths due to mechanical and/or size restraints on the system. Skew causes the position pulses to appear wider than they really are, and therefore can also cause the taper problem described above.

From the viewpoint of the inventor, most of the problems associated with the tri-bit servo pattern derive from its need to compare the strength of two distinct signals. The present invention circumvents or lessens these problems by averaging a single position pulse rather than comparing two separate pulses. The averaged position pulse is equal to a preset baseline voltage when the servo head is on track. Further, the polarity and magnitude of the averaged position pulse indicates the direction and amount by which the servo head is off track.

It is therefore a primary object of the present invention to provide an improved disc servo pattern and disc servo detector.

Another object of the present invention is to provide a disc servo pattern which is less subject to the problems of cross talk, taper and skew.

In summary, the invention is an improved disc servo pattern and servo detector for use in a system for reading and writing data on a magnetic disc. The magnetic disc has a servo data area formatted with a number of concentric servo tracks, each of which are formatted with a 1F-2F servo pattern. Each servo track contains many servo frames, and each servo frame has a single sync pulse and a single position pulse at predefined positions. The 1F frames are those frames where the sync pulse and position pulse are of opposite polarity. The 2F frames are those where the sync and position pulses are of like polarity. Fill-in pulses separate neighboring sync and position pulses of like polarity.

In a preferred embodiment the servo pattern in each servo track is the same as the servo pattern of the neighboring servo track shifted by one frame. Each track has a repeating pattern of two 1F frames followed by two 2F frames, and so on.

The system has a servo head for reading a servo pattern on a magnetic disc and producing a servo carrier signal corresponding thereto. The servo detector generates a position signal proportional in amplitude and polarity to the extent and direction that the servo data head is off track. It includes an amplifier for amplifying the servo signal and producing a servo carrier signal. An integrator integrates the servo carrier signal and develops a position signal. A switch connects the servo carrier signal to the integrator at times corresponding to the position pulses in a predefined pattern of the frames.

Additional objects and features of the invention will be more readily apparent from the following detailed description and appended claims when taken in conjunction with the drawings, in which:

FIG. 1 depicts a block diagram of a disc control system.

FIG. 2 depicts a magnetic disc.

FIG. 4 depicts a prior art tri-bit servo data pattern.

FIG. 5 depicts the two basic data patterns used as servo data in a system in accordance with the invention.

FIG. 6 depicts the servo data as written on 4 consecutively concentric tracks and the servo data as read in accordance with the invention.

FIG. 9 depicts a third preferred embodiment of a servo detector circuit in accordance with the invention.

Figure 3:
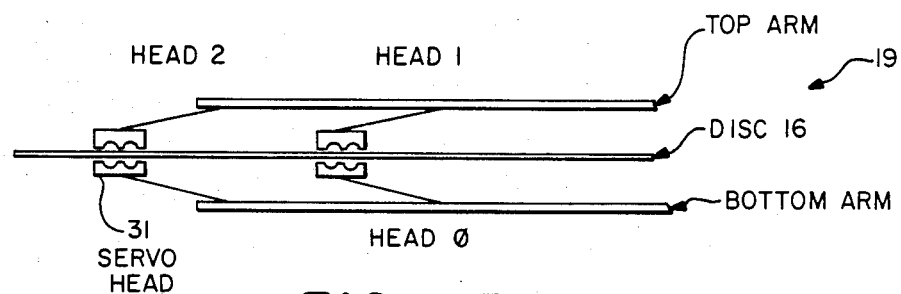
FIG. 3 depicts a portion of a disc drive having multiple disc heads for a single disc.

FIG. 10, consisting of A-D depicts a timing diagram for the circuit shown in FIG. 9.

FIG. 11 depicts a block diagram of a tachometer making use of the position signals produced by the servo detector circuit of the invention, and of an automatic gain control circuit for controlling the amplitude of the position signals produced by the servo detector circuit of the invention.

Referring to FIG. 1, the invention is an improved servo data pattern and servo detector 15 for use in a magnetic disc system 11. The context of the invention is a system 11 including a magnetic disc drive 12 and a disc servo system 13. Normally the disc servo system is responsive to commands from a device such as a computer 14 which uses the disc drive 12 and servo system 13 as a memory device.

The disc drive 12 includes a magnetic disc 16, a spindle 17 for rotating the disc, a disc housing 21 for holding the disc drive and for preventing dust from getting on the disc, and an actuator assembly 18. The actuator 18 includes arm assemblies 19 with read/write heads and a servo head which are further described below. An actuator controller 22 uses the position signals produced by the servo detector 15 and command signals from the computer 14 to control the radial position of the actuator 18. Also a tachometer 23, which is generally considered to be an integral part of the servo system, uses the position signals produced by the servo detector 15 to determine, or help determine, the radial velocity of the actuator 18.

The disc drive causes the disc 16 to spin at a high predetermined speed. The actuator assembly 18 moves back and forth over the surface of the disc 16 while the disc is spinning. Data can be recorded at and read from any particular location on the disc 16 by moving the arm assemblies 19 so that one of the read/write heads is at the radial position of the data and then waiting for the rotating disc 16 to rotate until the data moves under the read/write head.

The purpose of a servo detector 15 is to help determine the radial position of the arm assemblies 19 and the read/write heads. This information is then used by the disc servo system 13 to control the radial position of the arm assemblies 19.

Referring to FIG. 2, the usable portions of the disc 16 are generally referred to as data bands. Some discs have only one data band, but others, such as the one shown in FIG. 2 have several data bands. In FIG. 2 these data bands are labeled Data Band 0, Data Band 1, Data Band 2, and Servo Band.

The data bands are generally displaced somewhat from the rim and hub of the disc If there is more than one band on each side of the disc these bands are usually separated from one another by a dead-band area.

Each data band is divided into a number of closely spaced concentric tracks (not shown in the Figure). The division of the data bands into tracks is manifested only by the magnetic patterns written on the disc 16, not by any mechanical division.

Each track in the data bands is used to store data. In the servo band, a servo pattern is permanently stored. This servo pattern is normally imprinted on the disc 16 when the disc drive is made and is never changed thereafter.

Referring to FIG. 3, the arm assembly 19 for a dual sided disc, such as the one shown in FIG. 2, contains both top and bottom arms. For each data and servo band there is a separate head. The heads for the data bands are generally called read/write heads or data heads. As their name implies, they can be used to both read and write data. The head for the servo band is used only to read data and is generally called the servo head.

When the disc 16 is spinning and the heads are in use, the relative positions of the heads on the disc 16 are fixed. That is, if the servo head is at a particular radial position then the data heads are at corresponding radial positions. Variations in radial position due to mechanical stresses must be significantly less than the radial width of one track in order for the disc system 11 to operate properly.

Referring to FIG. 4, there is shown a tri-bit servo pattern which is characteristic of prior art servo patterns. The basic characteristic of the tri-bit servo pattern is that each servo frame is divided into three portions: a sync pulse portion and two position pulse portions. The position pulse time windows are labelled A and B. Only one of the two position pulse portions is used in each servo frame.

For the purposes of illustration it is assumed that there is a sync pulse at the boundary of each servo frame. Also, the position pulses in radially adjacent frames are assumed to always be in complementary positions.

The servo head is said to be "on track" when the servo head is placed precisely between two servo data tracks and is said to be "off track" whenever the servo head is displaced from this equilibrium position.

Another important aspect of the design of disc servo systems is that the servo head 31 is generally designed to detect magnetic signals from a area only about as wide as a track. Magnetic signals radially displaced by more than a half-track from the radial position of the servo head 31 are not detected. As a consequence, when the servo head 31 is between two servo data tracks it will pick up part of the servo pattern from each of the tracks but not from any other tracks. Furthermore, the closer the servo head is to a track the stronger the signals will be that are picked up by the servo head from that track. Therefore, if the servo head is precisely in-between two tracks, the servo signals from the two tracks will be equally strong. But if the servo head is not precisely in-between the two tracks the servo signals from the two tracks will not be equally strong.

The purpose of a servo detector 15 is to use the physical relationship between the location of the servo head and the relative strength of the servo signals from two radially adjacent servo tracks to determine when the servo head is on track and also to give some indication when it is off track just how far off track it is.

The tri-bit pattern is used by a servo detector as follows. A variable frequency oscillator VFO is synchronized with the sync pulse of each frame. Generally, the VFO is designed to run at a frequency which is a specified multiple, usually 16 or 32, of the frame rate. The VFO is used to derive two time windows A and B. During the A time window the peak amplitude of the servo signal is sampled and held on a first capacitor, and during the B time window the peak amplitude of the servo signal is sampled and held on a second capacitor. The two samples are then compared by an amplifier which produces a "position signal". The magnitude of the position signal is proportional to the extent to which the servo head is "off track". The position signal is used by the actuator controller 22 to control the position of the actuator assembly 18 and to thereby force the servo head 31 back on track.

The problems with the tri-bit servo pattern, which were briefly described above, are as follows. First, the tri-bit pattern is subject to "cross talk" from nearby data heads. Noise from other data heads when writting can cause the comparison of the two positioning bits in the tri-bit pattern to be corrupted because the noise may affect one of the sampled position pulses differently from the other.

Second, the tri-bit pattern is subject to a problem known as "taper". The position pulses of the tri-bit pattern are supposed to be sharp, well-defined pulses. Taper is caused by the widening of the position pulses in the tri-bit pattern, to the point where they start to overlap. This occurs, typically, as the disc head moves towards the center of the disc because of the lower linear velocity of the disc relative to the head. An example of position pulse widening and overlap is shown in the last frame of FIG. 4.

Restated, taper occurs when a portion of the first position pulse bleeds over into the time window for the second position pulse, and vice versa. Even if the magnitude of the bleed over is matched for the two pulses, the magnitude of the difference between the two position samples will be less than normal. Therefore the position signal, which is proportional to this difference in magnitude, will be smaller than normal. Thus taper is the variation in amplitude of the position signal with respect to radial position of the servo data head.

Taper tends to cause a problem known as overshoot. Overshoot occurs when the disc servo system 13, while trying to change the radial position of the data heads to a specified track, over accelerates the data heads, because of the changing amplitude of the position signal, and overshoots the position of the specified track. To compensate for taper, disc systems are typically designed to move the data heads more slowly than would be possible if taper did not exist. Therefore the tri-bit pattern's taper problem results in a reduction of the overall performance of the disc system.

Third, the tri-bit pattern is subject to a problem called skew, which can also cause taper. Skew is the angle between the data head and the circular data track at the point of the data head. Non-zero skew occurs in disc systems where the data heads move along a path which is not radial with respect to the discs. Many systems use non-radial data head paths due to mechanical and/or size restraints on the system. Skew causes the position pulses to appear wider than they really are, and therefore can also cause the taper problem described above.

Referring to FIG. 5, there are shown two servo frames, the first having a 1F servo data pattern and the second having a 2F servo data pattern. As in the illustration of the prior art servo data patterns, a sync pulse is located at the boundary of each servo frame. In the servo data pattern of the present invention, however, there is only one position pulse position in the middle of each frame. The position pulse can have either a positive or negative polarity. Furthermore, frames in which a position pulse is of the same polarity as the sync pulse (e.g. frame 2 in FIG. 5) also have fill-in pulses. The use of fill-in pulses is required because it is impossible to have two magnetic pulses of the same polarity in succession. Thus fill-in pulses convey no additional information and are used only to satisfy the laws of physics.

Given that the disc is rotating at such a rate that servo frames pass under the servo head at a rate of 1F, frames with position pulses of the opposite polarity as the sync pulse (e.g. frame 1 in FIG. 5) generate a servo signal with a frequency of 1F while frames with position pulses of the same polarity as the sync pulse (e.g. frame 2 in FIG. 5) generate a servo signal with a frequency of 2F. Thus the servo pattern of the present invention is called a 1F-2F servo pattern.

Referring to FIG. 6, the servo data as written in the preferred embodiment follows a quad pattern. The pattern in each servo track is the same as the radially adjacent track except that it is shifted by one frame. Furthermore, the servo pattern in each track is 1F 1F 2F 2F 1F 1F 2F 2F 1F 1F . . .

Therefore the full servo pattern is repeated every four tracks. For instance, track 3 in FIG. 6 is followed by a track having a pattern identical to the pattern of track 0.

The basic idea of the 1F-2F servo pattern is that when the servo head is on track, riding precisely between two servo tracks, the position pulses of every second servo frame will perfectly balance one another. Thus in the portion of FIG. 6 labeled "Servo Data as Read", the servo signal in time windows A and C is balanced when the servo head is on track.

A further aspect of the preferred embodiment of the 1F-2F servo pattern is that the frame position of the time windows to be used by the servo detector 15 shifts by one frame each time the servo head moves radially from one pair of tracks to another. From another view point, for any selected time window the position signal will be balanced on alternating tracks and for the other tracks will have a polarity indicating which track of the set of four tracks the servo head is over. The usefulness of this pattern is further discussed with reference to FIGS. 7 and 8.

As indicated above, in most servo frames there is a sync pulse at each frame boundary. However, special predefined data patterns called index patterns and guard band patterns can be written into the servo data by having certain servo frames written without a sync pulse. See for instance Frame 6 in FIG. 6. These markers generally are several frames long and include at least two frames which are missing sync pulses.

The pattern of missing sync pulses is detected by the disc servo system 13 and is used for certain predefined disc servo operations. For instance, a servo index marker is a special servo pattern recorded on every servo track which is used for synchronizing the servo system with the beginning of the track. Guard band patterns are used to indicate to the servo system how close the read/write heads are to the inner or outer edge of the data bands. This can be used, for instance, to reduce the velocity of the actuator assembly 18 during a track seek operation as the read/write heads reach the edge of the data bands.

Since the index and guard bank markers are at the same angular positions on every servo track, these markers are an exception to the rule that each servo track is the same as the radially adjacent track shifted by one frame. Alternately, these markers can be viewed as being superimposed over the servo pattern and thus not part of basic servo pattern. Nevertheless, the servo pattern is maintained through these marker areas in that the quad pattern of the position pulses is maintained.

Figure 7:
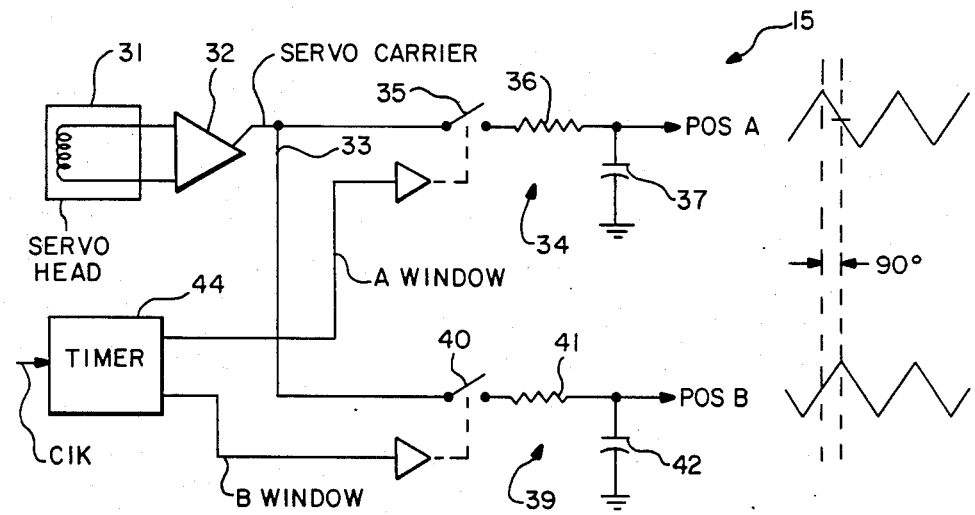
FIG. 7 depicts a first preferred embodiment of a servo detector circuit in accordance with the invention.

Referring to FIG. 7, in a preferred embodiment, the servo detector circuit 15 takes the signal produced by the servo head 31 and produces position signals POS-A and POS-B. As will be shown, these position signals are designed so that POS-A is a null signal and POS-B is at its peak value when the servo head is on track. When the servo head is off track, both position signals have a value corresponding to the direction and distance by which the servo head is off track from its corresponding equilibrium position.

The signal from the servo head 31 is amplified by an amplifier 32, which produces a servo carrier signal on line 33. In accordance with a predetermined pattern, at certain selected times the servo carrier signal is integrated. In the preferred embodiment two integrators 34 and 39 are used. Each integrator 34 (or 39) includes a switch 35 (40) controlled by the timer 44 which connects the servo carrier signal line 33 to a resistor 36 (41) and capacitor 37 (42). The signal on line 33 is integrated by the capacitor 37 (42) and the resulting voltage level is the position signal POS-A (POS-B).

As indicated in the figure, switch 35 is turned on at times corresponding to window A in FIG. 6 and switch 40 is turned on at times corresponding to window B. Therefore, when the servo head is slewing across the disc surface during a track seek operation the output of the two integrators 34 and 39 will look like the POS-A and POS-B signals drawn in the figure. Note that when the servo head is moving radially, it may move at a rate of up to 50,000 tracks per second on a long seek.

Also, note that the two position signals are 90° out of phase with one another. This phase relationship derives from the quad servo pattern, as described above, and is a manifestation of the fact that when the servo head is on track one of the position signals will be null and the other will be at its maximum amplitude.

When the servo system seeks a particular selected track, the timer 44 is programmed to issue window signals so that when the servo head reaches the selected track, POS-A will be a null signal and POS-B will be at its maximum amplitude. As shown in FIG. 6, with the quad servo pattern, each track has one of four possible window timing sequences. As will be clear to those skilled in the art, given a selected track it is a simple matter to determine which window pattern to use so that the position signals have their desired value (i.e., POS-A null and POS-B maximum) when the servo head reaches the selected track. Furthermore, while the servo head is slewing across the disc seeking the selected track, the position signals shown in FIG. 7 are used as inputs to a counter (not shown) in the servo system which determines when the servo head has reached the selected track.

The servo detector 15 of the invention is less sensitive to noise than systems using the tri-bit pattern because noise is a-c in nature and therefore is quickly averaged out by the integrators 34 and 39 in the invention.

The servo detector 15 of the invention is not subject to the taper and skew problems of the tri-bit servo systems because there is only one position pulse in each frame and therefore bleed-over of adjacent position pulses is impossible, in contrast to the tri-bit pattern.

Furthermore the fill-in pulses can be made closer to the sync pulses than shown in the figures, thereby increasing the width of the time window available for integrating the servo carrier signal.

Figure 8:
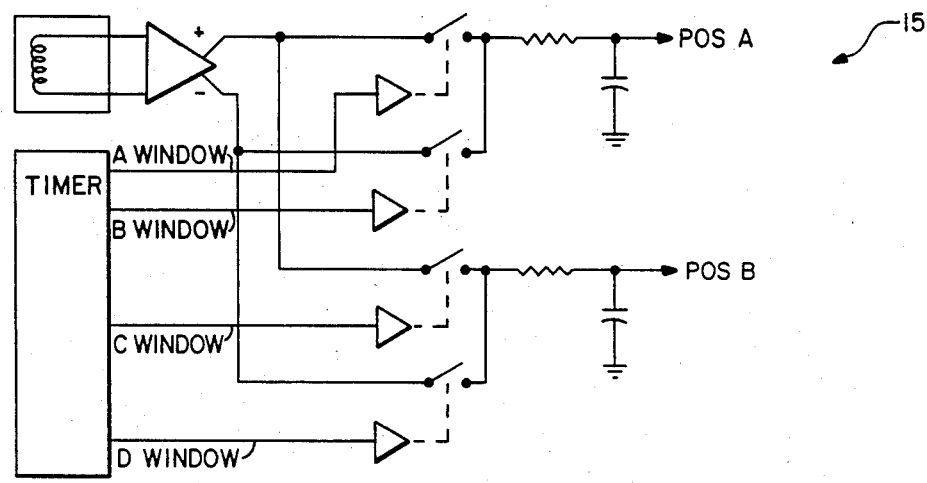
FIG. 8 depicts a second preferred embodiment of a servo detector circuit in accordance with the invention.

The servo detector 15 shown in FIG. 8 is the same as the one in FIG. 7 except that the first integrator 34 is now connected to the servo carrier signal during both the A and C window time frames, and the second integrator 39 is connected to the servo carrier signal during both the B and D windows. This embodiment updates the position signals at twice the rate of the embodiment in FIG. 7.

As can be seen, a servo detector in accordance with the invention could use just one integrator 34 because a single position signal would be sufficient to indicate when the servo head is on track and, when it is off track, the direction and distance by which it is off track. Such a system may require the timer 44 to change the window used for integration before the servo head moves to a new track. In the preferred embodiment the timer 44 performs this window shifting function each time the servo head moves to a new track because it is preferred to have POS-A and POS-B always serve the same role for every track seek operation.

Referring to FIGS. 9 and 10 there is shown a third preferred embodiment of the invention and an associated timing diagram. In light of the above discussions, the operation of this third preferred embodiment needs virtually no explanation. However, it should be noted that this embodiment, while somewhat more complex than the others, avoids the phase-shift in the position signals which is inherent in the simpler r-c integrator designs.

Referring to FIG. 11, it is also advantageous to produce two position signals because they can be used together in a tachometer 23 to produce a continuous velocity signal V. As shown, each position signal is amplified by an amplifier 51, 52 with complementary output signals. Each complementary amplified position signal is then differentiated using standard differentiator circuits 53 to 56. Then the four differentiated position signals are time multiplexed by a timer 57 and a multiplexer 58 in such a manner that each differentiated position signal is selected during the linear portion of its operation. This multiplexing can be done using standard design techniques well known to those skilled in the art. The resulting signal V is a continuous signal proportional to the velocity of the arm assemblies 19.

The second half of FIG. 11 shows an automatic gain control (AGC) circuit 26 for controlling the maximum amplitude of the position signals POS-A and POS-B. An AGC Reference signal is supplied by the servo control system 13 (generally by a microprocessor in the disc drive, not shown in the drawing) to specify the desired amplitude of the position signals. Circuits 61 and 62 rectify each position signal, producing signals which are combined and balanced against the AGC Reference signal by amplifier 63 to control an FET 64. This FET 64 varies the attenuation of the servo signal generated by the servo head, which controls the amplitude of the servo carrier signal and thereby controls the amplitude of the position signals generated by the servo detector 15.

Note that the rectified and combined position signals are balanced against the AGC Reference signal simply through the use of resistors R1, R2 and R3. These resistors act as a resistor divider and the action of the amplifier 63 forces the combined amplitude of the position signals to adjust until node 66 reaches zero volts (i.e., ground). When the position signals and the AGC Reference are not balanced a non-zero signal will presented to amplifier 63 which will cause the attenuation of the servo signal to be varied until the position and AGC Reference signals become balanced.

The voltage level of the AGC Reference signal corresponds directly to the desired combined amplitude of the position signals. For instance, if resistors R1, R2 and R3 all have equal resistance, then an AGC Reference signal of 1 volt will force the position signals to have a combined amplitude of 1 volt, i.e., the amplitude of POS-A plus the amplitude POS-B will equal 1 volt. Clearly, other resistor value combinations and/or other circuitry could be used to implement other preselected relationships between the AGC Reference signal and the combined amplitude of the position signals.

The effect of making the AGC circuit 26 responsive to the combined amplitude of two 90° phase shifted position signals POS-A and POS-B is to make the servo system 13 compensate for any variations in the intensity of the position pulses in the servo pattern. It also enables the servo system 13 to compensate for any widening of the position and fill-in pulses which would otherwise reduce the magnitude of the position signals and thereby cause a taper problem. Thus the use of an AGC circuit 26 which is responsive to the combined amplitude of two such position signals, instead of being responsive to the magnitude of the position pulses themselves, can essentially eliminate the taper and skew problems of the prior art.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. In a system for reading and writing data on a magnetic disc, having a servo head for reading a servo pattern on a magnetic disc and for producing a servo carrier signal corresponding thereto:
    a magnetic disc having a servo data area formatted with a multiplicity of servo tracks formatted with a 1F-2F servo pattern; each said servo track being divided into a multiplicity of frames each having a single sync pulse and a single position pulse at predefined positions;
    wherein
    a multiplicity of said frames are 1F frames having a 1F format wherein said sync pulse and said position pulse are of opposite polarity, and a multiplicity of said frames are 2F frames having a 2F format wherein said sync and position pulses are of like polarity and are separated by a fill-in pulse of opposite polarity to said neighboring sync and position pulses;
    each said servo track having a multiplicity of both 1F and 2F frames arranged in a predefined pattern.

2. In the system of claim 1,
    demodulator means responsive to said servo carrier signal for producing two position signals having a relative phase difference;
    tachometer means for producing a continuous velocity signal proportional to the velocity of said servo head, including
        differentiating means for differentiating said position signals and thereby producing at least four differentiated position signals; and
        multiplexing means for producing said continuous velocity signal by multiplexing said differentiated position signals so that each differentiated position signal is used to generate said continuous velocity signal during time periods when said differentiated position signal is linearly proportional to the velocity of said servo and data heads.

3. In the system of claim 1, said servo pattern in each servo track being the same as servo pattern in the neighboring servo track shifted by one frame.

4. In the system of claim 3, said servo pattern including a multiplicity of frames in each track having a repeating pattern of two successive 1F frames followed by two successive 2F frames.

5. In the system of claim 1, said 1F-2F servo pattern including, a index marker in each track comprising a set of frames in which at least two frames, at predefined relative positions, are missing a sync pulse.

6. In the system of claim 5, said 1F-2F servo pattern further including guard band markers in a multiplicity of said tracks comprising a set of frames in which at least two frames, at predefined relative positions, are missing a sync pulse; the guard band servo pattern being distinct from the index marker pattern.

7. In the system of claim 1,
    amplifier means for amplifying the signal derived from the servo head and producing a servo carrier signal;
    means for generating a position carrier signal proportional in amplitude and polarity to the extent and direction that the servo data head is off track, including servo demodulator means comprising:
        integration means for integrating said servo carrier signal and developing a position signal; and
        switch means for connecting said servo carrier signal to said integration means at times corresponding to the position pulses in a predefined pattern of said frames.

8. In the system of claim 7, two of said servo demodulator means, each responsive to the position pulses in a distinct set of frames, providing two position signals having a relative phase difference.

9. In the system of claim 7, said amplifier means having complementary output servo carrier signals; said servo demodulator means having first and second switch means for each integration means for coupling the complementary servo carrier signals to the integration means at times corresponding to the position pulses in a predefined pattern of frames which is 90° out of phase with the times with one another.

10. In the system of claim 1,
    servo demodulator means comprising:
        amplifier means for amplifying the signal derived from the servo head and producing a servo carrier signal;
        a plurality of integration means, each integration means having means for integrating a servo carrier signal and developing a corresponding position signal; and
        a plurality of switch means, each switch means for connecting said servo carrier signal to one of said integration means at times corresponding to the position pulses in a predefined pattern of said frames;
        said plurality of integration and switch means providing at least two position signals having a relative phase difference.

11. In the system of claim 10, automatic gain control means for controlling the amplitude of said position signals, including means for combining said position signals; said automatic gain control means being responsive to the amplitude of said combined position signal.

12. In a method of aligning a disc servo head between any two servo adjacent tracks on a rotating magnetic disc having a multiplicity of concentric servo tracks, the disc servo data head being in such physical proximity with the rotating magnetic disc so as to read a servo pattern on the magnetic disc and produce a servo carrier signal corresponding thereto:
    providing a magnetic disc having a servo data area formatted with a 1F-2F servo pattern; said 1F-2F servo pattern comprising a pattern wherein each servo track is divided into a multiplicity of frames including a multiplicity of both 1F and 2F frames, each said frame having a single sync pulse and a single position pulse at predefined positions; said 1F frames each having a sync pulse and position pulse of opposite polarity, and said 2F frames each having a sync pulse and position pulse of like polarity; said sync and position pulses being separated by a fill-in pulse where neighboring sync and position pulses are of like polarity; and generating a position signal proportional in amplitude and polarity to the extent and direction that the servo head is off track, including the steps of:

sampling said servo carrier signal at times corresponding to a selected pattern of said position pulses; and integrating said servo carrier signal samples, thereby developing a position signal.

13. In the method of claim 12, said servo pattern in each servo track being the same as servo pattern on the neighboring servo track shifted by one frame;

said sampling step including sampling said servo carrier signal at two sets of times corresponding to two distinct patterns of said position pulses; and said integrating step including separately integrating said two sets of servo carrier signal samples, thereby developing two position signals which are out of phase with one another by a predefined phase difference.

14. In the method of claim 13, combining said position signals; and controlling the amplitude of said servo carrier signal so as to achieve a specified amplitude for said combined position signal.

15. In the method of claim 14, said combining step including the steps of rectifying said position signals and combining said rectified position signals; and said controlling step including the steps of providing a reference signal and balancing said combined position signal against said reference signal; thereby causing the amplitude of said combined position signal to adjust to a value corresponding to said reference signal.

16. In a system for reading and writing data on a magnetic disc, having a servo head for reading a servo pattern on a magnetic disc and for producing a servo carrier signal corresponding thereto, and at least one data head having a fixed position relative to the position of said servo head for reading data stored on the magnetic disc:

a magnetic disc having at least one data area and a distinct servo area, said servo area formatted with a multiplicity of servo tracks, each said data area including a multiplicity of radially separated data tracks; each said servo track being divided into a multiplicity of frames each having a single position pulse, including a multiplicity of frames with position pulses of opposite polarity;

demodulator means responsive to said servo carrier signal for producing two position signals having a relative phase difference;

actuator control means for controlling the radial position of said servo and data heads including means for moving said servo and data heads until a first one of said position signals reaches a predefined value when said data head is being centered on any one of a first predefined set of data tracks, and means for moving said servo and data head until the other one of said position signals reaches said predefined value when said data head is being centered on any one of a second predefined set of data tracks which is distinct from said first predefined set of data tracks; and automatic gain control means for controlling the amplitude of said position signals, including means for combining said position signals; said automatic gain control means being responsive to the amplitude of said combined position signal.

17. In the system of claim 16, means for providing a reference signal for use in said automatic gain control means;

said automatic gain control means including means for scaling both of said position signals by a factor corresponding to the sum of the amplitudes of both of said position signals and thereby causing the amplitude of said combined position signal to adjust to a value corresponding to said reference signal.

18. In the system of claim 16, tachometer means for producing a continuous velocity signal proportional to the velocity of said servo and data heads, including differentiating means for differentiating said position signals and thereby producing at least four differentiated position signals; and multiplexing means for producing said continuous velocity signal by multiplexing said differentiated position signals so that each differentiated position signal is used to generate said continuous velocity signal during time periods when said differentiated position signal is linearly proportional to the velocity of said servo and data heads.

* * * * *